United States Patent [19]

Bauer

[11] Patent Number: 4,671,348
[45] Date of Patent: Jun. 9, 1987

[54] TRANSVERSE FLOW EDGE HEAT PIPE

[75] Inventor: Paul E. Bauer, Florissant, Mo.

[73] Assignee: McDonnell Douglas Corporation, Long Beach, Calif.

[21] Appl. No.: 736,624

[22] Filed: May 21, 1985

[51] Int. Cl.[4] ............................ B64C 1/38; B64C 3/36
[52] U.S. Cl. ......................................... 165/41; 165/44;
 165/104.26; 244/117 A; 244/158 A
[58] Field of Search ................... 165/104.26, 41, 47,
 165/44; 244/117 A, 158 A

[56] References Cited

U.S. PATENT DOCUMENTS

| 3,369,782 | 2/1968 | Billig et al. | 244/117 A |
| 3,450,195 | 6/1969 | Schnacke | 165/47 |
| 3,749,156 | 1/1973 | Eby | 165/47 |
| 3,837,311 | 9/1974 | Lea, Jr. | 165/104.26 |
| 3,929,305 | 12/1975 | Sabol | 244/117 A |
| 4,207,027 | 6/1980 | Barry et al. | 416/96 R |

FOREIGN PATENT DOCUMENTS

1956361 5/1971 Fed. Rep. of Germany ... 244/117 A

Primary Examiner—Albert W. Davis, Jr.
Attorney, Agent, or Firm—James M. Skorich; George W. Finch; John P. Scholl

[57] ABSTRACT

An edge situated in high speed flow of medium is cooled by a tubular heat pipe having a longitudinal axis situated parallel to the edge. The exterior surface of the evaporator section of the heat pipe forms the edge. The heat pipe contains a working fluid existing in both gaseous and liquefied states. Heat input along the edge evaporates working fluid in the liquid state located in the evaporator section, and the heat is transferred transversely across the longitudinal axis of the heat pipe by the flow of vapor to the condenser section. The vapor condenses in the condenser section and releases its latent heat of vaporization. The condensate flows to the evaporator section by means of wicks composed of capillary material. The heat released into the walls of the condenser section is transferred through the walls by conduction and into another heat transfer device, for example, an active cooling apparatus or the evaporator sections of abutting heat pipes of conventional tubular configuration.

15 Claims, 12 Drawing Figures

TRANSVERSE FLOW EDGE HEAT PIPE

BACKGROUND OF THE INVENTION

1. Field of the Invention

This invention relates to heat pipes, and more particularly to heat pipes for cooling an edge situated in high speed flow of medium.

2. Description of the Prior Art

The maximum temperatures on a hypersonic flight vehicle typically occur along the leading edges of its wings, fins and engine inlet lips, and the edges comprising its fuselage chines. A severe thermal trajectory, such as that for a re-entry into the earth's atmosphere, causes extreme temperature levels that could exceed the thermal-structural capabilities of such an edge. In addition, thermal stress in the edge is caused by large variations in the aerodynamic heating about the stagnation line.

The shape of the edge has a direct influence on the aerodynamic performance of the airfoil or fuselage chine and, ultimately, the flight vehicle, with performance qualitatively increasing with a decrease in the radius of curvature of the edge. More particularly, a smaller edge radius increases the range of a vehicle because it increases the maximum lift to drag ratio; allows a higher Mach number at a lower altitude; and permits flatter adjacent surfaces, which are easier to fabricate and thus have lower tooling and manufacturing costs than more curved surfaces, as well as providing more usable interior volume. An added benefit of sharper edges on a military flight vehicle is a reduction in the vehicle's radar cross section and radar reflection.

However, a reduction in the edge radius causes an increase in the maximum temperature experienced along the edge, and thus the advantages attendant to decreasing the radius cannot be obtained without augmenting the capability of the edge to withstand the accompanying increase in temperature.

There are three generic means for protecting an edge from the effects of extremely high temperatures generated by aerodynamic heating during a re-entry trajectory: (1) constructing the edge of a refractory material; (2) covering the edge with a thickness of ablative material; and (3) employing apparatus to cool the edge.

With regard to the refractory materials approach, there are a number of materials commonly considered: ceramics, carbon-carbon, graphites and columbium (also known as niobium) alloys.

High temperature ceramics have a higher density than the other materials commonly used, and adversely affect the vehicle's performance because of added weight. Ceramics are also brittle, and thus susceptible to fracture by workmen during installation or vehicle maintenance. In addition, this characteristic renders the edge vulnerable to cracking from thermal shock, that is, a rapid change in temperature such as that occasioned when rain is encountered while the ceramic edge still retains the heat acquired during a severe thermal trajectory. Ceramics are also subject to local melting, with the liquefied material either running until solidifying on a cooler surface area, or being swept away by the slipstream. In either case, a surface irregularity on the edge is created which increases the drag and otherwise causes the aerodynamic properties of the edge to deviate from the design parameters. The latter consequence is of prime importance where the edge is located on a guided missile because it will adversely affect the missile's accuracy.

Carbon-carbon and graphite are not susceptible to local melting, and otherwise maintain their structural integrity in a severe thermal environment, but must be coated with a hard durable covering such as silicon carbide because both materials sublimate when subjected to high temperatures in the presence of oxygen. Thus, even a minute flaw in the covering will result in the formation of craters during a thermal trajectory that will increase drag, cause the aerodynamic characteristics of the edge to deviate from their design parameters and, as the craters become larger, ultimately affect the structural integrity of the edge unless the edge is refurbished. In addition, graphite is very fragile and thus particularly susceptible to damage from workmen.

Columbium (also known as niobium) alloys also require a coating because they will oxidize when exposed to oxygen at high temperatures, but at a much lower rate than the sublimation of carbon-carbon or graphite. Thus, should the coating be flawed, columbium will be subject to the same problems as carbon-carbon and graphite, but the degradation in aerodynamic performance will be substantially slower and not require the refurbishment of the edge for a number of missions. However, columbium alloys have a relatively high density and are very expensive, and thus considerations of weight and expense militate against their use.

The common alloys of other refractory materials such as molybdenum, tantalum, and tungsten are similarly prone to oxidation at high temperatures, but are less desirable than the columbium alloys because they weigh and cost even more.

Due to considerations of weight and expense, the internal structural members situated behind an edge are not designed to withstand temperatures anywhere near those experienced at the edge. For example, at 500° F. a structural member made from an aluminum alloy will retain only 20% of its room temperature load bearing capability, whereas it is not uncommon for temperatures along a leading edge or fuselage chine of a hypersonic flight vehicle to exceed 3500° F. In order to allow the internal structure to be constructed of relatively light and inexpensive material, thermal insulation is inserted in between the edge and the internal structure, and the members which support the edge from the internal structure are designed to prevent excessive heat from being conducted through them to the internal structure. The design of the support members is further complicated because they must withstand the thermal stress caused by the extreme temperature differential occurring between the edge and the internal structure, as well as the material fatigue that accrues with repeated missions.

As the edge temperature increases, the weight of the required insulation increases along with the complexity of the design of the support members. Thus, it is more desirable to protect the edge with an ablative material or cooling apparatus rather than a refractory material because the former protects by maintaining the edge temperature at a relatively low level and thereby avoids the thermal design problems attendant to the extremely high temperatures experienced throughout edges made from refractory materials.

Following the same reasoning, the advantages noted with respect to the weight of the insulation and complexity of the support members where an ablative material or cooling apparatus is used instead of a refractory material become even more pronounced when the higher temperatures caused by a sharper edge are considered.

Ablators protect the underlying structure from the effects of high temperatures by absorbing the heat and ablating when a high heating rate is sustained, thereby transferring the heat into the ambient slipstream with the ablated material. The main drawbacks to this approach are that, due to the erosion inherent in its use, the edge must be refurbished with a new thickness of ablative material after every flight, and leading edges and surfaces aft of the ablating edge are subject to being damaged by abrasion from the particles of ablated material introduced into the slipstream. In addition, the aerodynamic performance of the edge and, ultimately, the flight vehicle suffers from the recession of the edge surface. Another problem of particular significance to a military application is the increased radar reflection occasioned by the dispersion of the ablated material throughout the flow field.

The other solution to the problem of severe aerodynamic heating along an edge located in high speed flow of medium is to to provide a cooling apparatus. Active cooling devices, transpiration apparatus and heat pipes are examples of cooling apparatus that have been employed in such a situation.

Active cooling is achieved by passing a coolant medium through pipes that run near the edge. The temperature along the edge is reduced by the transfer of heat from the edge to the circulating coolant medium, with the heat ultimately being rejected to a heat sink at another point in a closed loop. This approach requires the installation of a pressurized circulatory cooling system comprised of a pump, piping, coolant medium and a means to cool the coolant medium. Thus, attendant to the use of active cooling are considerations of space, expense, added weight and a source for the work necessary to operate the pump and cool the coolant medium. As the required work is typically obtained from the vehicle's engine, this solution adversely affects the engine's performance and increases fuel consumption. The reliability of the system is also a factor which bears consideration in view of the fact that a crack or fracture in the pressurized piping will result in a loss of the coolant medium and cause a complete failure of the system, a potentially catastrophic event given the severity of the thermal environment and the design function of the edge.

A transpiration cooling system forces a relatively cool fluid to pass over or through the surface to be cooled and then exhausts the fluid into the ambient atmosphere, obtaining the transfer of heat from the surface by the mechanism of convection. If the fluid is in its liquid state, additional cooling can be obtained from the absorption of heat occurring with the evaporation of the liquid into its gaseous state. As this is typically an open loop system, it requires a reservoir of cool, pressurized fluid to carry away the heat, and thus has a finite cooling capacity.

When used on a flight vehicle, the system includes a pressurized storage tank that must be refilled with cooling fluid before every flight, together with a series of valves and sensors necessary to avoid expelling more fluid than is required to maintain the desired surface temperature. The tank adds to the gross weight of the flight vehicle and it, as well as the valves and connecting tubing, must be routinely checked for leaks. A further drawback is manifest from noting that the area to be cooled usually requires a series of openings in it for the cooling fluid to pass through and exhaust into the slipstream. Although this has been done on a nose tip, such a design requirement makes this system very impractical in many potential applications.

Heat pipes have also been used as a means of cooling an edge on a flight vehicle. Briefly, a heat pipe is a tube having closed ends and enclosing a working fluid and a longitudinal wick. One region of the heat pipe (the evaporator) receives a local heat input which is conducted through the wall of the pipe and into the wick lining the interior surface of the pipe. The heat is absorbed by evaporating liquid working fluid contained in the wick in the evaporator region of the pipe. Due to a pressure differential, the vapor flows to the relatively cooler region of the heat pipe (the condenser) where it condenses upon the wick, releasing its latent heat of vaporization. The heat is then conducted through the wick and walls of the condenser where it is rejected by radiation and/or convection into free space, or conducted into a relatively cooler area, thereby completing the transfer of heat from the point of input to either free space or a cooler area. The liquid condensate flows by capillary action through the wick to the evaporator, thereby completing the closed loop cycle and providing a constant supply of liquefied working fluid for evaporation. The rate at which a heat pipe can transfer heat from the input point, and therefore its overall cooling capacity, increases as the distance the vapor must travel between the evaporator and the condenser is reduced.

Figure 1:
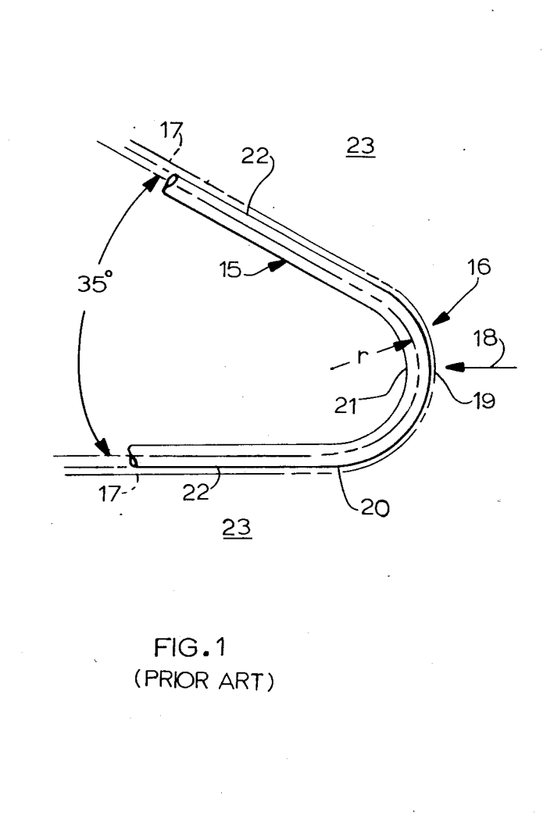
FIG. 1 is a fragmentary sectioned side view of an edge cooled by a plurality of adjacent, parallel curved heat pipes of the prior art, with the edge skin drawn in phantom.

Turning to the prior art pictured in FIG. 1, a plurality of adjacent parallel conventional heat pipes 15 are shown installed in edge 16, with edge skin 17 drawn in phantom. Edge 16 is situated in high speed flow of medium having local wind vector 18 and stagnating along line 19.

Each conventional heat pipe 15 is contained within a rigid, longitudinal tube 20, and is curved along its longitudinal axis with its evaporator section 21 centered about its minimum radius of curvature, r, and located about stagnation line 19. Two condenser sections 22 lie on either side of evaporator section 21, and are located adjacent to cooler surfaces of edge skin 17. The wick (not shown) is situated along the interior surface of tube and runs between evaporator section 21 and condenser sections 22. Heat generated along edge 16 about stagnation line 19 is transferred by a working fluid (not shown) from evaporator section 21 to condenser sections 22. The heat is conducted through the thickness of tube 20 to the edge skin 17 adjacent to condenser sections 22, where it is rejected by radiation and convection into ambient atmosphere 23.

There are two problems with this approach firstly, due to bending limits for the high strength materials necessarily used in the manufacture of the heat pipe tubes, there is a lower limit on the radius of curvature, r, that can be manufactured without cracking or kinking tube 20, or without kinking the wick, and this limit, in turn, translates into a lower limit on the radius of edge 16 that can be cooled with conventional heat pipes 15. The minimum radius of curvature is a function of the material used to make the tube, the diameter of the tube, and the tube wall thickness. As an example, a tube made of Hastelloy X (the trademark for a nickel base super alloy produced by the Union Carbide Corporation) having an outer diameter of 0.5 inch and a wall thickness of 0.015 inch has a minimum radius of curvature (to the center line of the tube), r, of approximately two inches.

Figure 2:
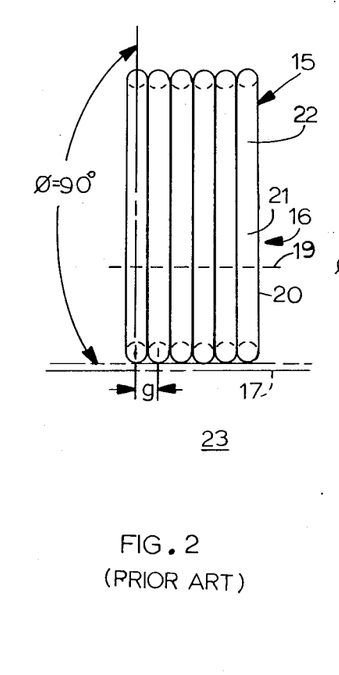
FIG. 2 is a fragmentary frontal view of the edge shown in FIG. 1, with the edge skin drawn in phantom in order to illustrate the adjacent, parallel, curved heat pipes of the prior art installed in a normal orientation relative to the bottom surface of the edge.

The second design problem encountered with the use of conventional heat pipes to cool edges is illustrated by FIG. 2, a front view of adjacent parallel conventional heat pipes 15. When the pipes are placed in abutment with each other, there is a gap between them which increases from the point of abutment to a maximum distance, g, at edge skin 17. Points on edge skin 17 located along a locus of mid-points of a particular gap, g, and lying near stagnation line 19 will realize a higher maximum temperature for any trajectory than the other areas of edge 16 that lie closer to a heat pipe. The gaps thus diminish the cooling effect of parallel heat pipes 15 because they serve to increase the maximum temperature that edge 16 must be designed and constructed to withstand.

Figure 3:
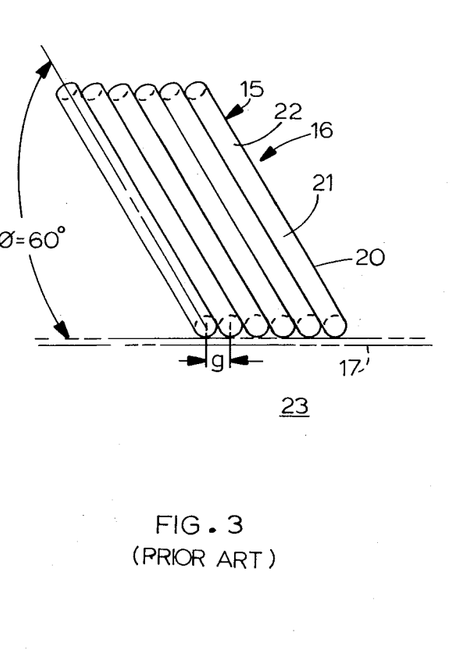
FIG. 3 is a fragmentary frontal view of an edge with the edge skin drawn in phantom in order to illustrate the adjacent, parallel, curved heat pipes of the prior art installed with a slant angle of $\phi = 60°$ relative to the bottom surface of the edge.

In order to reduce the effective edge radius otherwise required, parallel pipes 15 have been slanted as shown in FIG. 3. The slant angle is $\phi$, that is, the angle between the plane containing the longitudinal axis of a heat pipe 15 and a plane containing the lower section on edge skin 17. The conventional, unslanted, vertical heat pipes 15 have a $\phi = 90°$. With the radius of curvature, r, of heat pipes 15 held constant at its minimum value, the effective edge radius is reduced as $\phi$ is decreased. However, as $\phi$ is decreased, the gap, g, between adjacent heat pipes 15 along edge skin 17 increases from a minimum value for $\phi$ equal to 90°, and causes an increase in the maximum temperature realized at the hot spots located at the mid-points of each gap, g, resulting from the increase in the distance between the respective mid-points and adjacent heat pipes 15. As the edge must be designed to withstand the highest temperatures occurring at any lateral point along it, the effect of increasing the gap, g, largely offsets the benefits derived from decreasing the effective edge radius by slanting the heat pipes For example, at $\phi = 20°$ the effective edge radius is cut in half, but the gap, g, between adjacent heat pipes 15 is tripled.

Another approach has been to employ a heat pipe having a transverse cross sectional shape other than circular, for example, trapezoidal or rectangular, in order to decrease the gap between adjacent heat pipes. However, the fabrication of such non-circular shapes entails significantly more expense than a circular cross section In addition, pipes having non-circular cross sections are still subject to the limit of a minimum radius of curvature necessary to avoid kinking or cracking the tube or kinking the wick. Furthermore, as it is very difficult to specially fabricate non-circular tubes in a slanted configuration, such tubes must be installed in a vertical orientation and cannot be slanted to reduce the effective edge radius.

SUMMARY OF THE PRESENT INVENTION

The present invention is a tubular heat pipe for cooling an edge situated in high speed flow of medium. The edge is formed by the exterior surface of the tube containing the heat pipe, while the juxtaposed interior surface of the tube comprises the evaporator section of the heat pipe. The condenser section lies transversely across from the evaporator section, with both sections running the longitudinal length of the tube containing the heat pipe.

Aerodynamic heating occurring along the edge is conducted to the evaporator, where it is absorbed by the evaporation of the working fluid and subsequently transferred transversely across the longitudinal axis of the heat pipe by the flow of vapor from the evaporator to the condenser. The vapor condenses along the wick lining the walls of the condenser and releases its latent heat of vaporization, with the condensate being returned to the evaporator by capillary action through diametrical and circumferential wicks.

In order to prevent the failure of the entire system in the event the edge is punctured, the heat pipe of the present invention is divided by thermally conductive walls into a plurality of identical heat pipes that lie side by side.

The condenser section of the edge heat pipe rejects the heat directly into the ambient atmosphere or into a thermally connected conventional heat transfer device. For example, the auxiliary device could be a series of leg heat pipes of conventional design having their respective evaporator sections abutting the condenser section of the edge heat pipe. Heat from the condenser section of the edge heat pipe is conducted into the evaporator sections of the leg heat pipes, where it is transferred by vapor flow to the respective condenser sections. The heat is then transferred by conduction to an adjacent, relatively cooler surface area of the vehicle skin where it is rejected into the ambient atmosphere. The heat pipe of the present invention provides a solution to the problem of aerodynamic heating generated along edges situated in high speed flow of medium that is less expensive and lower in weight than using a refractory material. Moreover, in direct contrast to the use of a refractory material, the heat pipe of the present invention keeps the maximum temperature on the edge cool enough to allow it to be constructed of relatively inexpensive and durable super alloys that do not require frequent periodic refurbishment; will not subject the edge to deterioration and variation in aerodynamic performance due to local melting or sublimation; and simplifies problems relating to the design of the structural members which support the edge from the internal structure, as well as the thermal insulation for the internal structure of the flight vehicle In contrast with employing an ablative material, the flight vehicle can be reused without requiring the refurbishment of its edges after every mission; edges and surfaces aft of the edges will not be eroded and damaged; and the reflected radar image of the vehicle will not be amplified.

The present invention cools an edge without the adverse affect on engine performance and fuel consumption, the added weight, the considerable expense, and the continuous maintenance requirements of an active cooling system, while needing less space and performing with greater reliability.

The present invention does not require the design of the edge of the flight vehicle to be modified to accommodate holes, nor does it have the further drawbacks of limited capacity, complexity and continual maintenance inherent to transpiration cooling systems. The heat pipe of the present invention provides a flight vehicle with the significant advantages of cooling its edges with a heat pipe, while allowing the vehicle to realize the increased performance and smaller radar reflection of a sharper edge heretofore unobtainable with a conventional heat pipe. These advantages are the product of a design which altogether avoids the longitudinal bending limits of conventional heat pipes which previously set a lower limit on the radius of the edge that could be accommodated.

The heat pipe of the present invention is able to adequately transfer and reject the increased heat caused by a sharper edge by using a configuration which substantially reduces the travel distance for the vapor and the condensate between the evaporator and the condenser sections in comparison to the travel distance in conventional heat pipes In addition, as the heat pipe of the present invention is virtually contiguous along the length of the edge, the hot spots along the edge occasioned by the gaps between parallel, conventional heat pipes are eliminated.

OBJECTS OF THE INVENTION

An object of the present invention is to adequately and reliably cool an edge situated in high speed flow of medium.

Another object of the present invention is to cool an edge situated in high speed flow of medium using an apparatus that is light, inexpensive and maintenance free.

Yet another object of the present invention is to cool an edge on a flight vehicle situated in high speed flow of medium without requiring work from an engine.

A further object of the present invention is to cool an edge situated in high speed flow of medium using apparatus that is durable and reusable after being subjected to severe aerodynamic heating.

Another object of the present invention is to cool an edge on a flight vehicle situated in high speed flow of medium without eroding or otherwise damaging flight vehicle surfaces situated aft of the edge.

Still another object of the present invention is to adequately cool an edge situated in high speed flow of medium without developing hot spots along the edge.

Yet another object of the present invention is to cool an edge on a metal flight vehicle situated in high speed flow of medium by a means that allows the vehicle's radar reflection to be reduced.

A further object of the present invention is to cool the leading edge of an airfoil or a fuselage chine situated in high speed flow of medium while allowing the airfoil or fuselage chine to exhibit constant, predictable aerodynamic characteristics.

Still another object of the present invention is to maintain the temperature of an edge on a flight vehicle situated in high speed flow of medium at a relatively low level, and thereby: (1) allow the edge to be made from a relatively light and inexpensive super alloy; (2) allow the internal structure to be comprised of relatively inexpensive and light non-refractory material with a minimum of insulation in between the edge and the internal structure, and (3) provide for a minimum of complexity in the thermal design of the members supporting the edge from the internal structure.

Other objects, advantages and novel features of the invention will become apparent from the following detailed description of the preferred embodiments of the invention when considered in conjunction with the accompanying drawings.

DESCRIPTION OF THE PREFERRED EMBODIMENTS

Figure 4:
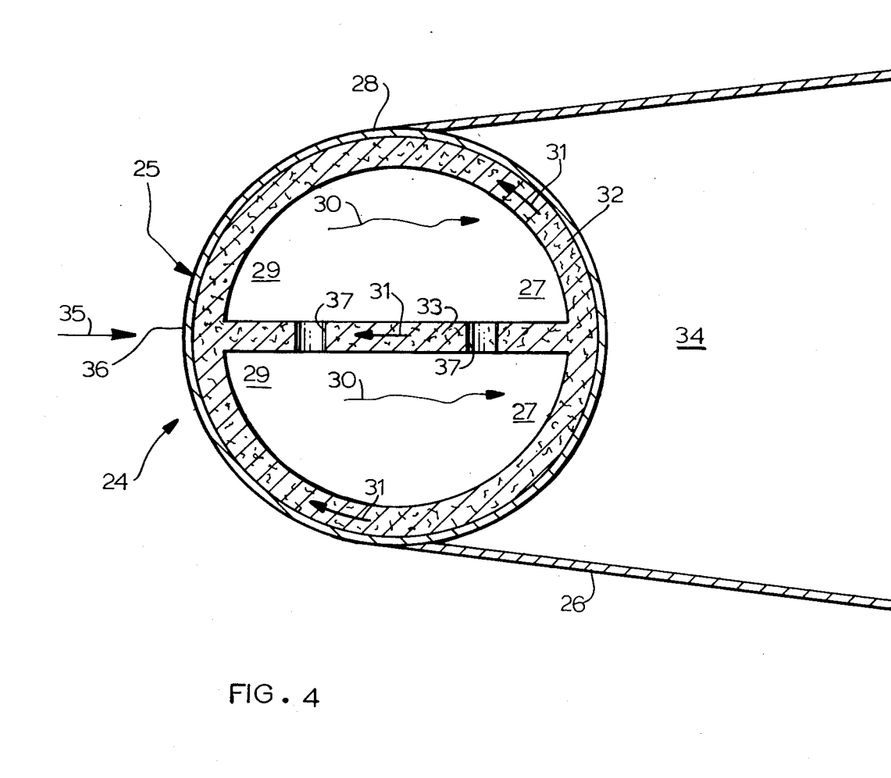
FIG. 4 is a sectioned side view of a preferred embodiment of the present invention shown installed in the leading edge of an airfoil.

Turning to FIG. 4, edge heat pipe 24, a preferred embodiment of the present invention, is shown installed in leading edge 25 of airfoil 26 and situated with its longitudinal axis lying parallel to leading edge 25. It is to be understood that edge heat pipe 24 is not limited to the illustrated application, but can be similarly used to cool the fuselage chine of a space vehicle or the lip of an engine inlet, among other applications.

Tubular casing 28 contains edge heat pipe 24. The components of edge heat pipe 24 include evaporator 29, condenser 27, and a working fluid in the states of vapor 30 and fluid 31. Circumferential wick 32 and diametrical wick 33 are both thicknesses of capillary material, with circumferential wick 32 lining the interior sides of casing 28 and diametrical wick 33 laterally extending from condenser 27 to evaporator 29 and bisecting tubular casing 28. A secondary heat transfer device (not shown) is located in space 34, and is in thermal contact with condenser 27.

Leading edge 25 is comprised of the exterior surface of the section of casing 28 which contains evaporator 29 along its interior surface, and is situated in high speed flow of medium having local wind vector 35 (shown for a zero angle of attack) and stagnating along stagnation line 36.

Aerodynamic heating is generated along leading edge 25 about stagnation line 36, and is conducted through casing 28 into evaporator 29. Fluid 31 is contained in the section of circumferential wick 32 located in evaporator 29, and absorbs the heat in evaporating to form vapor 30. As condenser 27 is cooler than evaporator 29, there is a pressure differential between the two regions which causes vapor 30 to flow to condenser 27.

Vapor 30 condenses in the section of circumferential wick 32 lining the interior wall of condenser 27, and releases its latent heat of vaporization into the capillary material and adjacent casing 28. The heat is conducted through casing 28 and rejected into a secondary heat transfer device located in adjacent space 34. The condensate, fluid 31, flows by means of circumferential wick 32 and diametrical wick 33 to evaporator 29, completing a closed loop cycle.

The secondary heat transfer device can be conventional heat pipes, an active cooling system, or any other apparatus capable of transferring heat away from casing 28.

Holes 37 are located in diametrical wick 33 to allow vapor 30 to flow between the upper and lower halves of tubular casing 28. This feature becomes significant when airfoil 26 assumes an angle of attack relative to local wind vector 35 because, under such a condition, stagnation line 36 and the aerodynamic heating centered about stagnation line 36 will move away from the centerline of airfoil 26 (the position of stagnation line 36 for the zero angle of attack shown in FIG. 4). Under such unsymmetrical heating conditions, the coolest part of condenser 27 will be in the half of tubular casing 28 opposite that of stagnation line 36 and will cause a substantial flow of vapor 30 between the halves of tubular casing 28 lying on opposing sides of diametrical wick 33.

Figure 5:
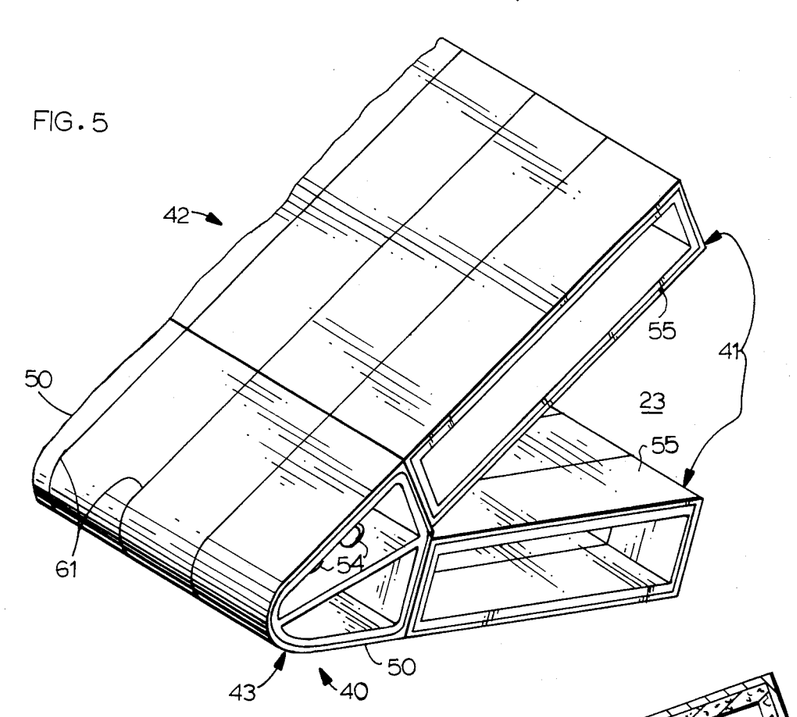
FIG. 5 is a fragmentary sectioned perspective view of a second preferred embodiment of the present invention shown installed in the leading edge of an airfoil.
Figure 6:
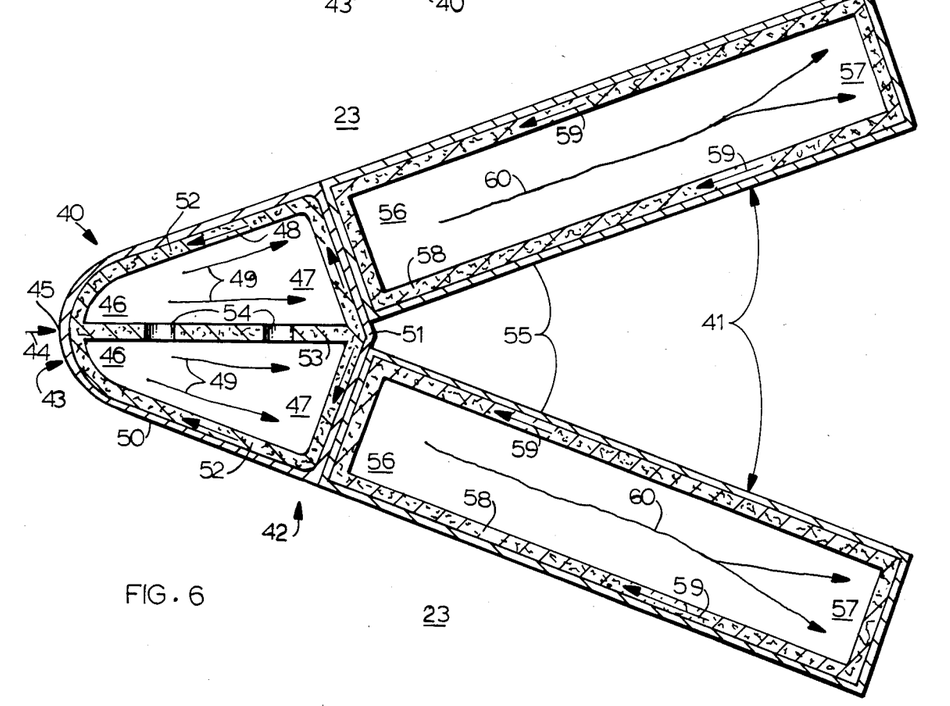
FIG. 6 is a sectioned side view of the second preferred embodiment of the present invention previously shown in FIG. 5.

FIGS. 5 and 6 illustrate edge heat pipe 40, another preferred embodiment of the present invention. Edge heat pipe 40 abuts and is thermally connected to leg heat pipes 41, and is shown operationally installed in airfoil 42 with the longitudinal axis of edge heat pipe 40 lying parallel to leading edge 43 of airfoil 42. Airfoil 42 is situated in high speed flow of medium having local wind vector 44 and stagnating along stagnation line 45.

Edge heat pipe 40 is comprised of evaporator 46, condenser 47, and a working fluid in the states of liquid 48 and vapor 49, all contained inside of rigid, tubular casing 50. Evaporator 46 is located along the interior, concave surface of tubular casing 50, while leading edge 43 is formed by the exterior surface of tubular casing 50. Condenser 47 is located along the interior surface of aft heat pipe wall 51.

Circumferential wick 52 is a thickness of capillary material lining the interior surface of tubular casing 50. Diametrical wick 53 is a thickness of capillary material bisecting leading edge heat pipe 40 and extending diametrically from the interior surface of aft heat pipe wall 51 to the interior surface of the section of tubular casing 50 which forms leading edge 43. Holes 54 are located in diametrical wick 53 to allow for the flow of vapor 49 under unsymmetrical heating conditions, that is, when the angle of attack is not zero.

Each leg heat pipe 41 has a conventional tubular configuration, and each is comprised of rigid, closed tube 55 enclosing evaporator 56, condenser 57, wick 58 and a working fluid in the states of liquid 59 and vapor 60. Wick 58 is a thickness of capillary material lining the interior surface of tube 55.

The longitudinal end of leg heat pipe 41 which contains evaporator 56 abuts aft heat pipe wall 51 of edge heat pipe 40. In order to facilitate thermal conduction between them, the abutting surfaces should be flat, and the abutting walls as thin as the respective vapor pressures of edge heat pipe 40 and leg heat pipes 41 will permit. Aft heat pipe wall 51 and the adjacent walls of leg heat pipes 41 can be integrally produced in order to further enhance thermal conductivity by eliminating any discontinuity and reducing the thickness of material between them.

Aerodynamic heating occurs along leading edge 43 about stagnation line 45, and is transferred by conduction through tubular casing 50 into evaporator 46. The working fluid typically used in applications where the working temperature of the heat pipe will be approximately 1800° F., for example, sodium or lithium, will be frozen at room temperature, and thus in a solid state. After a start up period necessary to melt the frozen working fluid, heat is absorbed by the evaporization of liquid 48 contained in the capillary material of circumferential wick 52 located in evaporator 46.

Vapor 49 flows towards the relatively cooler region of condenser 47, where it condenses onto the wicking material of circumferential wick 52 and releases its latent heat of vaporization into aft heat pipe wall 51. The condensate, liquid 48, returns to evaporator 46 by means of circumferential wick 52 and diametrical wick 53, thus completing the closed loop cycle.

With respect to each leg heat pipe 41, the heat released by the condensation of vapor 49 is conducted through the interface of aft heat pipe wall 51 and tube 55, into the relatively cooler region of evaporator 56. After a startup period necessary to melt the frozen working fluid, the heat vaporizes liquid 59 located in wick 58 to form vapor 60, which flows towards the relatively cooler region of condenser 57. Upon reaching condenser 57, vapor 60 condenses into wick 58, releasing its latent heat of vaporization into the walls of condenser 57. The heat is then rejected by radiation and convection from the walls of tube 55 into ambient atmosphere 23. The condensate, liquid 59, flows through wick 58 to evaporator 56, thus completing the closed loop cycle for leg heat pipe 41.

In essence, edge heat pipe 40 in conjunction with leg heat pipes 41 transfers heat from leading edgte 43 to a cooler, larger surface area, that is, the exterior surface of tubes 55 adjacent to the region of condenser 57, where it can be rejected into ambient atmosphere 23. The overall heat transfer capacity of edge heat pipe 40 increases with the exterior surface area of tubes 55 available to reject heat intO ambient atmosphere 23. Thus its heat transfer capacity can be tailored to suit the anticipated thermal environment of airfoil 42 by selecting the appropriate length for leg heat pipes 41.

If edge heat pipe 40 were to suffer a puncture anywhere along the span of leading edge 43, the working fluid would escape and leading edge 43 would be left without cooling means for the remainder of the flight. Thus, for purposes of reliability, edge heat pipe 40 is divided into a plurality of juxtaposed sections by a plurality of parallel, thermally conductive walls 61 that are impermeable to the working fluid and oriented normal to the longitudinal, spanwise axis of tubular casing 50. The spanwise breadth of each section can be calculated by methods known in the art to ensure that adjacent sections are capable of transferring sufficient heat from a punctured section to keep the maximum temperature along leading edge 43 below the critical value at which structural failure would occur. Reliability considerations also suggest that each juxtaposed section of edge heat pipe 40 be abutted by at least one upper leg heat pipe 41 and at least one lower leg heat pipe 41.

Figure 7:
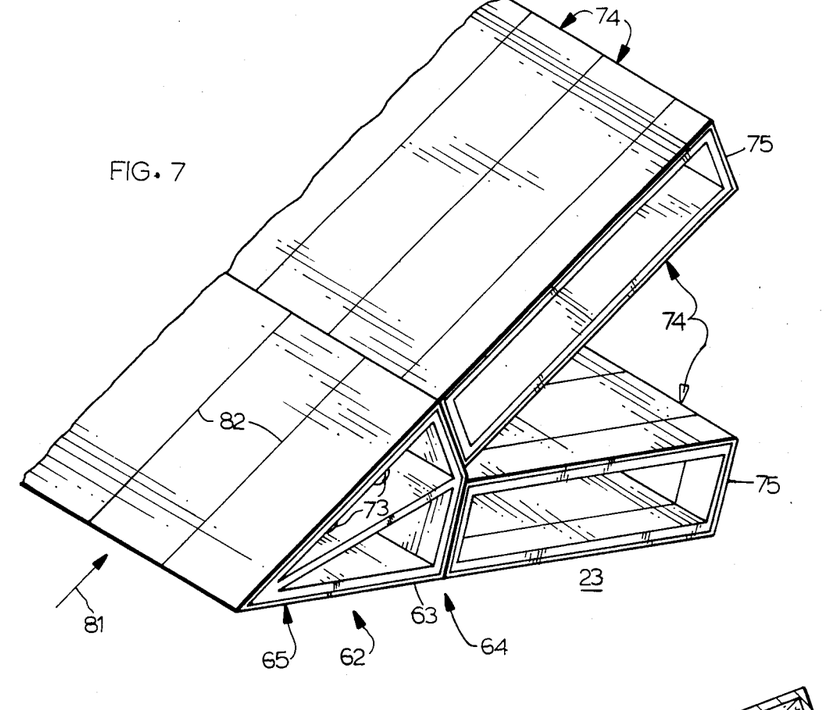
FIG. 7 is a sectioned perspective view of a third preferred embodiment of the present invention shown installed in a leading edge.
Figure 8:
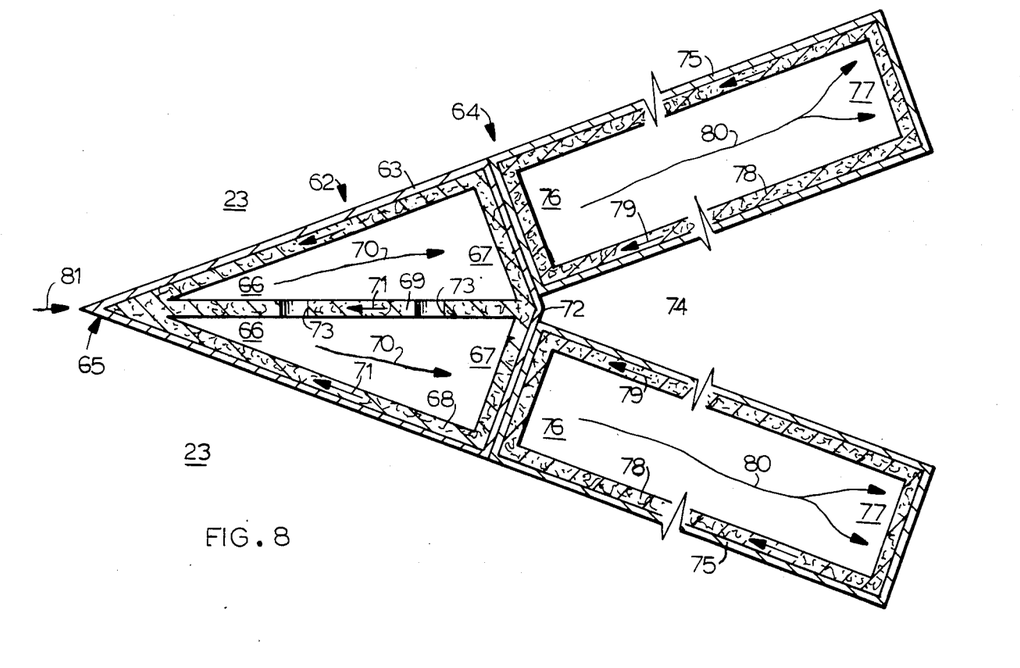
FIG. 8 is a sectioned side view of the third preferred embodiment of the present invention previously shown in FIG. 7.
Figure 9:
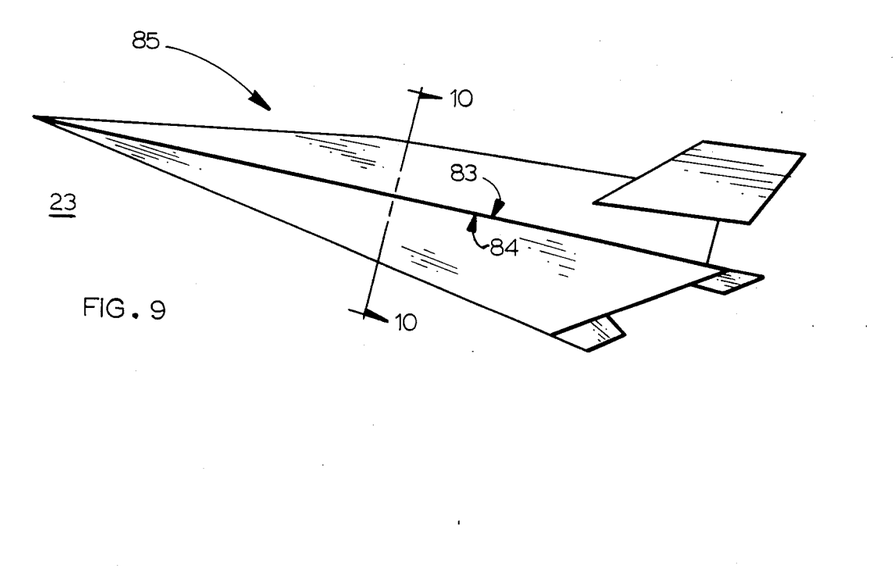
FIG. 9 is a perspective view of a space vehicle having a fourth preferred embodiment of the present invention installed along its fuselage chines.
Figure 10:
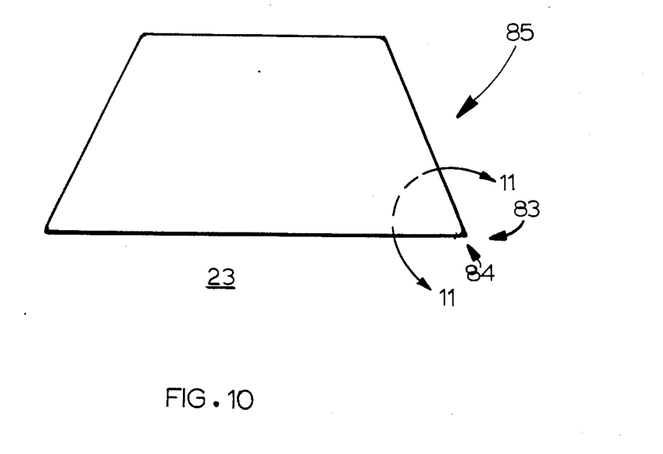
FIG. 10 is an enlarged sectioned view of the space vehicle taken along line 10 of FIG. 9.

Turning to FIGS. 7 and 8, edge heat pipe 62, another preferred embodiment of the present invention for cooling a pointed leading edge, is shown installed in airfoil 64.

Tubular casing 63 encloses edge heat pipe 62, and also comprises leading edge 65 of airfoil 64. Edge heat pipe 62 is comprised of evaporator 66, condenser 67, surface wick 68, center wick 69, and a working fluid in the states of vapor 70 and liquid 71. Surface wick 68 and center wick 69 are composed of a thickness of capillary material, with surface wick 68 lining the interior surfaces of tubular casing 63 and center wick 69 bisecting tubular casing 63 and extending from aft heat pipe wall 72 to the point of leading edge 65. Holes 73 are located in center wick 69.

Leg heat pipes 74 have a conventional tubular configuration, and each is enclosed in a rigid tube 75 and is comprised of evaporator 76, condenser 77, surface wick 78, and a working fluid in the states of liquid 79 and vapor 80. Surface wick 78 is composed of a thickness of capillary material and lines the interior surface of tube 75.

The end of leg heat pipe 74 which contains evaporator 76 abuts aft heat pipe wall 72 of edge heat pipe 62, while condenser 77 is located in the opposite end of leg heat pipe 74. In order to facilitate thermal conduction between the two adjacent heat pipes and thereby maximize the heat transfer rate of edge heat pipe 62, the abutting walls are in flat abutment and as thin as the respective vapor pressures of edge heat pipe 62 and leg heat pipe 74 will allow. A further improvement in thermal conductivity can be obtained by integrally producing aft heat pipe wall 72 and the adjacent wall of leg heat pipe 74, to thereby eliminate any discontinuity as well as reduce the thickness of material between the two heat pipes.

When situated in high speed flow of medium having local wind vector 81, aerodynamic heating is symmetrically generated about the point of leading edge 65 and is transferred by conduction through tubular casing 63 and into the region of evaporator 66. After a start up period required to melt the initially frozen working fluid, the heat is absorbed by the evaporation of liquid 71 into vapor 70.

Due to the pressure differential between evaporator 66 and condenser 67, vapor 70 flows into the region of condenser 67, condenses into surface wick 68 lining the walls of condenser 67, and releases its latent heat of vaporization. The condensate, liquid 71, flows by means of surface wick 68 and center wick 69 to evaporator 66, completing the closed loop cycle for edge heat pipe 62.

The heat released by the condensation of vapor 70 is conducted through aft heat pipe wall 72 and the abutting wall of leg heat pipe 74, into the region of evaporator 76. Again, after a startup period necessary to melt the frozen working fluid, the heat conducted from edge heat pipe 62 vaporizes liquid 79 into vapor 80, and is transferred by the flow of vapor 80 into the relatively cooler region of condenser 77. Vapor 80 condenses into surface wick 78 lining condenser 77, and releases its latent heat of vaporization.

The condensate, liquid 79, returns to evaporator 76 by means of surface wick 78, completing the closed loop cycle for leg heat pipe 74. The heat released into the walls of condenser 77 is conducted through the thickness of tube 75 and rejected by radiation and convection into ambient atmosphere 23, thereby completing the transfer of heat from leading edge 65 into the heat sink comprised of ambient atmosphere 23.

For reasons of reliability, previously discussed in detail with respect to edge heat pipe 40, edge heat pipe 62 may be divided into a plurality of juxtaposed, independently operating heat pipe sections by a plurality of parallel, thermally conductive walls 82 that are impermeable to the working fluid and oriented normal to the longitudinal axis of tubular casing 63. The breadth of each heat pipe section is calculable by methods known in the art to ensure that adjacent sections can transfer sufficient heat from a failed section to keep the maximum temperature along the section of leading edge 65 otherwise cooled by the failed section below the critical temperature at which structural failure could occur.

With respect to both the upper and lower rows of leg heat pipes 74, leg heat pipes 74 are staggered so that parts of two leg heat pipes 74 abut each section of edge heat pipe 62. Thus, in the event of the failure of a section of edge heat pipe 62, the abutting two leg heat pipes 74 can still contribute to the transfer of the additional heat load carried by the sections of heat pipe 62 adjacent to the failed section. This configuration will improve the overall performance of edge heat pipe 62 in the event of the failure of a section of heat pipe 62 in comparison to the unstaggered, one leg heat pipe to one edge heat pipe section configuration illustrated in FIG. 5.

FIGS. 9, 10, 11, and 12 illustrate edge heat pipe 83, another preferred embodiment of the present invention, installed in fuselage chine 84 of space vehicle 85.

Tubular casing 86 encloses edge heat pipe 83, and is comprised of concave wall 87 and flat aft wall 88. The exterior surface of concave wall 87 forms fuselage chine 84 of space vehicle 85.

Figure 11:
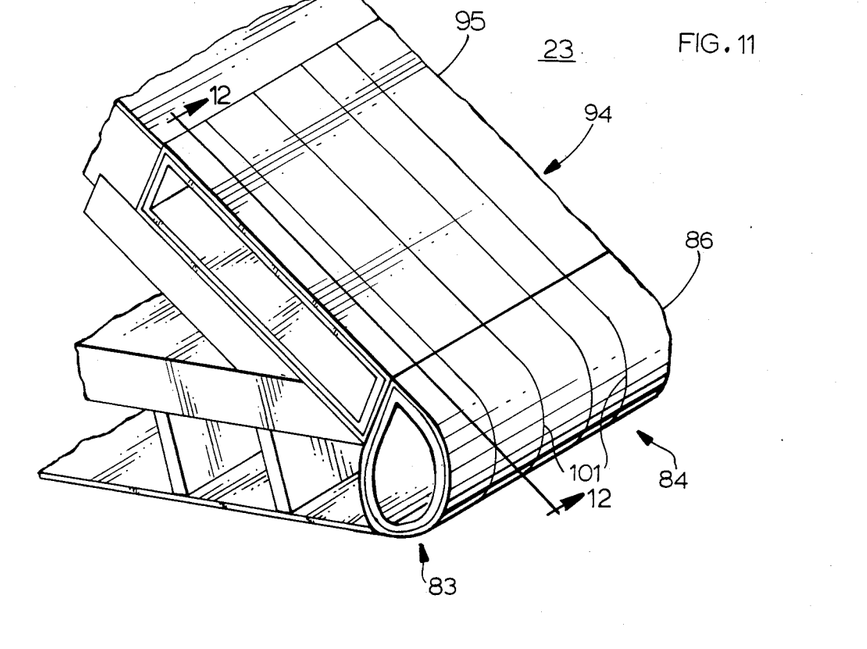
FIG. 11 is an enlarged fragmentary perspective view of the area of the fuselage chine enclosed by arrow 11 in FIG. 10, and particularly illustrating the fourth preferred embodiment of the present invention.
Figure 12:
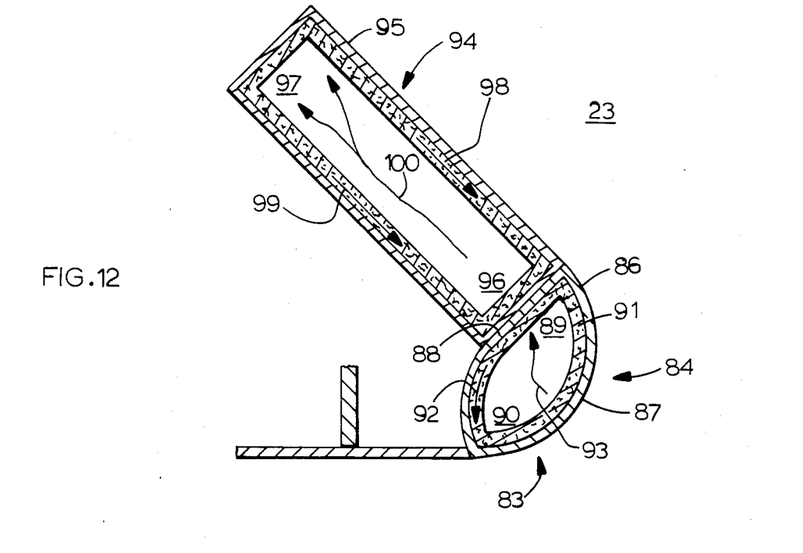
FIG. 12 is an enlarged fragmentary sectioned view of the fourth preferred embodiment of the present invention taken along line 12 in FIG. 11.

Edge heat pipe 83 is comprised of condenser 89, evaporator 90, surface wick 91, and a working fluid in the states of liquid 92 and vapor 93. Evaporator 90 is located along the interior surface of concave wall 87. Condenser 89 is situated along the interior surface of flat aft wall 88. Surface wick 91 is a thickness of capillary material lining the inner surface of tubular casing 86.

Leg heat pipe 94 is enclosed within closed tube 95 and is further comprised of evaporator 96, condenser 97, wick 98, and a working fluid in the states of liquid 99 and vapor 100. Wick 98 is a thickness of capillary material lining the interior surface of tube 95.

An end of tube 95 is in abutment with flat aft wall 88 of tubular casing 86. The abutting walls are in flat abutment and each is as thin as the respective vapor pressures of edge heat pipe 83 and leg heat pipe 94 will permit, in order to facilitate thermal conduction between the two heat pipes and thereby maximize the heat transfer rate of edge heat pipe 83. Evaporator 96 is located in the end of leg heat pipe 94 which abuts flat aft wall 88, and condenser 97 is located in the opposite end. A further improvement in the thermal conductivity between heat pipe 83 and leg heat pipe 94 can be obtained by integrally producing flat aft wall 88 and the adjacent wall of leg heat pipe 94, thereby eliminating any discontinuity as well as reducing the thickness of material between the two heat pipes.

When situated in high speed flow of medium, aerodynamic heating is generated along fuselage chine 84 and is transferred by conduction through concave wall 87 of casing 86 into the region of evaporator 90. After a startup period necessary to melt the initially frozen working fluid, the heat is absorbed by the evaporation of liquid 92 into vapor 93. Due to the pressure differential between evaporator 90 and condenser 89, vapor 93 flows into the region of condenser 89, where it condenses into surface wick 91 and releases its latent heat of vaporization. The condensate, liquid 92, flows by means of surface wick 91 to evaporator 90, completing the closed loop cycle for edge heat pipe 83.

The heat released by the condensation of vapor 93 is conducted through flat aft wall 88 and the abutting wall of tube 95 into evaporator 96 of leg heat pipe 94. Again, after a startup period necessary to melt the frozen working fluid, the heat conducted from edge heat pipe 83 is absorbed by the evaporization of liquid 99 into vapor 100. Due to the pressure differential between evaparator 96 and condenser 97, vapor 100 flows into the cooler region of condenser 97, where it condenses into wick 98 and releases its latent heat of vaporization.

The condensate, liquid 99, returns to evaporator 96 by means of wick 98, completing the closed loop cycle for leg heat pipe 94. The heat released into the walls of condenser 97 is conducted through the thickness of tube 95 and rejected by radiation and convection into ambient atmosphere 23. The length of leg heat pipes 94 is selected to provide the surface area necessary to reject the heat transferred from fuselage chine 84 into ambient atmosphere 23.

As previously discussed with respect to edge heat pipe 40, edge heat pipe 83 is divided into sections by a plurality of parallel, thermally conductive walls 101 that are impermeable to the working fluid and oriented normal to the longitudinal axis of tubular casing 86. The length of each section is calculated by methods known in the art to ensure that adjacent sections can provide sufficient cooling to keep the maximum temperature of a section of fuselage chine 84 otherwise cooled by a failed heat pipe section below the critical temperature at which structural failure could occur. Each of the juxtaposed sections of edge heat pipe 83 is abutted by at least one leg heat pipe 94.

Changes and modifications in the specifically described embodiments can be implemented without departing from the scope of the invention, which is intended to be limited only by the scope of the appended claims.

What is claimed is:

1. A leading edge heat pipe for a flight vehicle comprising:
   a closed tube;
   a working fluid enclosed in said tube and existing as both a liquid and a vapor;
   said tube having a warm region and a cool region, said warm region being warm relative to said cool region, and both said warm region and said cool region continuing for the longitudinal length of said closed tube;
   capillary material contained in said tube for conveying said liquid from said cool region to said warm region;
   a warm lateral tube wall included in said warm region and a cool lateral tube wall included in said cool region;
   secondary heat transfer means for transferring heat away from said cool lateral tube wall; and
   said warm lateral tube wall forming a leading edge on a flight vehicle.

2. The leading edge heat pipe as defined in claim 1 further comprising:
   at least one partition dividing said closed tube into a plurality of longitudinally juxtaposed closed tubes; and
   said partition being thermally conductive and impermeable to said working fluid.

3. The leading edge heat pipe as defined in claim 2 wherein:
   said capillary material lines the inner surfaces of said closed tube.

4. The leading edge heat pipe as defined in claim 3 further comprising:
   an additional quantity of said capillary material extending in a planar fashion from said cool lateral tube wall to said warm lateral tube wall and defining vapor passageways therethrough.

5. The leading edge heat pipe as defined in claim 4 wherein:
   said leading edge is the foremost edge of an air foil.

6. The leading edge heat pipe as defined in claim 4 wherein:
   said leading edge is a fuselage chine.

7. The leading edge heat pipe as defined in claim 4 wherein:
   said leading edge forms the lip of an engine inlet.

8. The leading edge heat pipe as defined in claim 2 wherein said secondary heat transfer means is comprised of:
   at least one leg heat pipe;
   said leg heat pipe being tubular and having a warm leg heat pipe end and a cool leg heat pipe end, said warm leg heat pipe end being warm relative to said cool leg heat pipe end; and
   said warm leg heat pipe end being in thermal contact with said cool lateral tube wall.

9. The leading edge heat pipe as defined in claim 8 wherein:
   said cool leg heat pipe end rejects heat into free space.

10. The leading edge heat pipe as defined in claim 9 wherein:
    said at least one leg heat pipe has its longitudinal axis situated transverse to the longitudinal axis of said closed tube.

11. The leading edge heat pipe as defined in claim 10 wherein:
    said capillary material lines the inner surfaces of said closed tube.

12. The leading edge heat pipe as defined in claim 11 further comprising:
    an additional quantity of said capillary material extending in a planar fashion from said cool lateral tube wall to said warm lateral tube wall and defining vapor passageways therethrough.

13. The leading edge heat pipe as defined in claim 11 wherein:
    said leading edge is the foremost edge of an airfoil.

14. The leading edge heat pipe as defined in claim 11 wherein:
    said leading edge is a fuselage chine.

15. The leading edge heat pipe as defined in claim 12 wherein:
    said leading edge forms the lip of an engine inlet.

* * * * *

UNITED STATES PATENT AND TRADEMARK OFFICE
CERTIFICATE OF CORRECTION

PATENT NO. : 4,671,348

DATED : 09 June 1987

INVENTOR(S) : Paul E. Bauer

It is certified that error appears in the above—identified patent and that said Letters Patent is hereby corrected as shown below:

Column 4, line 44, the numeral --20-- should be inserted after the word "tube".

Column 4, line 53, a colon followed by a space --: -- should be inserted after the word "approach".

Column 5, line 38, a period followed by two spaces --.  -- should be inserted after the word "pipes".

Column 5, line 47, a period followed by a space --. -- should be inserted after the word "section".

Column 6, line 41, a period --.-- should be inserted after the word "vehicle".

UNITED STATES PATENT AND TRADEMARK OFFICE
CERTIFICATE OF CORRECTION

PATENT NO. : 4,671,348

DATED : 09 June 1987

INVENTOR(S) : Paul E. Bauer

It is certified that error appears in the above—identified patent and that said Letters Patent is hereby corrected as shown below:

Column 7, line 7, a period followed by a space --. -- should be inserted after the word "pipes".

Column 10, line 40, the word "edgte" should be changed to --edge--.

Column 10, line 46, the word "intO" should be changed to --into--.

Column 14, line 57, (Claim 13) the numeral "11" should be replaced with the numeral --12--.

Signed and Sealed this

Ninth Day of February, 1988

Attest:

DONALD J. QUIGG

Attesting Officer

Commissioner of Patents and Trademarks